(12) United States Patent
Heller et al.

(10) Patent No.: US 8,032,716 B2
(45) Date of Patent: Oct. 4, 2011

(54) SYSTEM, METHOD AND COMPUTER PROGRAM PRODUCT FOR PROVIDING A NEW QUIESCE STATE

(75) Inventors: Lisa C. Heller, Rhinebeck, NY (US);
Michael F. Fee, Cold Spring, NY (US);
Christine C. Jones, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 12/037,904

(22) Filed: Feb. 26, 2008

(65) Prior Publication Data
US 2009/0216928 A1   Aug. 27, 2009

(51) Int. Cl.
*G06F 12/00* (2006.01)
(52) U.S. Cl. ............ 711/141; 711/207; 711/E12.014; 711/E12.061
(58) Field of Classification Search .................. None
See application file for complete search history.

(56) References Cited

U.S. PATENT DOCUMENTS

| | | | |
|---|---|---|---|
| 5,632,032 A | 5/1997 | Ault et al. | |
| 5,761,734 A * | 6/1998 | Pfeffer et al. | 711/164 |
| 5,961,584 A | 10/1999 | Wolf | |
| 6,119,219 A * | 9/2000 | Webb et al. | 712/227 |
| 6,219,690 B1 | 4/2001 | Slingwine et al. | |
| 6,671,795 B1 | 12/2003 | Marr et al. | |
| 6,675,192 B2 | 1/2004 | Emer | |
| 6,996,698 B2 * | 2/2006 | Slegel et al. | 711/220 |
| 7,020,761 B2 * | 3/2006 | Siegel et al. | 711/202 |
| 2002/0087765 A1* | 7/2002 | Kumar et al. | 710/107 |
| 2004/0221131 A1* | 11/2004 | Brewer | 711/207 |
| 2004/0230758 A1* | 11/2004 | Slegel et al. | 711/164 |
| 2004/0230768 A1* | 11/2004 | Slegel et al. | 711/206 |
| 2004/0230976 A1* | 11/2004 | Slegel et al. | 718/100 |
| 2007/0113217 A1* | 5/2007 | Gish et al. | 717/120 |

OTHER PUBLICATIONS

"IBM® z/Architecture Principles of Operation", Publication No. SA22-7832-05, 6th Edition, Apr. 2007. 1,215 pages separated into 4 electronic attachments.
Makris, Kristis, et al. "Dynamic and Adaptive Updates of Non-Quiescent Subsystems in Commodity Operating System Kernels". EuroSys '07. Mar. 21-23, 2007. Lisboa, Portugal. pp. 327-340.

* cited by examiner

*Primary Examiner* — Matt Kim
*Assistant Examiner* — Ralph A Verderamo, III
(74) *Attorney, Agent, or Firm* — Cantor Colburn LLP; John Campbell

(57) ABSTRACT

A system, method and computer program product for providing a new quiesce state. The method includes receiving a quiesce request at a system controller from an initiating processor. The quiesce request is sent to a plurality of processors. Notification is received at the system controller that the processors have finished purging their translation look aside buffers (TLBs). A fast quiesce reset command is received at the system controller from the initiating processor once updates to the system resources are complete. It is indicated to the processors that the block translation restriction can be dropped in response to receiving the fast quiesce reset command, thereby allowing the processors to continue processing without block translation restrictions.

15 Claims, 15 Drawing Sheets

SYSTEM, METHOD AND COMPUTER PROGRAM PRODUCT FOR PROVIDING A NEW QUIESCE STATE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

This invention relates generally to processing within a computing environment, and more in particularly reducing system overhead associated with broadcast operations The processing of a request by one processor of a computing environment may affect one or more other processors of the environment. For example, in a Symmetric Multiprocessing System (SMP) based on the IBM z/Architecture, there are certain broadcast purge operations such as Set Storage Key (SSKE), Invalidate Page Table Entry (IPTE), Invalidate DAT Table Entry (IDTE) and Compare and Swap and Purge (CSP and CSPG) which require all the processors in the system to quiesce in order to observe the system update(s) consistently. Other computer architectures also provide a similar mechanism.

One common implementation for the quiesce purge operation includes the following: 1) all the processors are quiesced (i.e., most normal processing operations are suspended, including accessing the TLB and ALB); 2) any buffered entries in the Translation Look-aside Buffers (TLBs) and/or in the Access-Register-Translation Look-aside Buffer (ALB) which are dependent on the resources being updated are invalidated; 3) the common resource (translation table entry in storage for IPTE, IDTE, CSP or CSPG or a storage key for SSKE) is updated, and 4) finally, the quiesce is released and the processors continue their normal activity. Obviously, this implementation could have a major performance impact, especially for large SMP configurations, since all processors must be quiesced for the duration of the operation. In particular, it is common that one processor is executing a long running instruction that is not interruptible, so that the one processor can not reach the quiesced state for some time. Thus, all other processors are required to wait for this last processor to reach the quiesced state before the steps described above can be completed.

Some strides have been made in the above processing to enhance performance by attempting to quiesce the processors for a shorter period of time. For example, in some implementations when a processor receives a request, it immediately quiesces and then purges the appropriate entries in its own TLB and/or ALB. After the purge is complete, this processor is allowed to continue processing subject to various restrictions. One of these restrictions includes that the processor is not permitted to perform address translation or fetch a storage key but instead must stall until the quiesce is released. Only after the quiesce is released, indicating that the system resources have been updated, are all restrictions removed from the processors.

Further strides to enhance performance are directed to reducing the restriction applied to address translation and key accesses during the quiesce window. For example, after purging its own TLB and/or ALB the purging processor is only restricted, using the page index (PX), segment index (SX) and/or absolute address of the translation, to perform an address translation or key access which potentially uses the system resources being updated by the quiesce operation.

Other performance enhancements have been directed to reducing the number of processors which need to honor the quiesce request. Since 1) the interruption of processors to honor the quiesce request is needed to prevent inconsistent values for translation tables or storage keys from being observed in the middle of an instruction or function and 2) when the active zone on the receiving processor is different from the zone which initiated the quiesce operation, the storage accesses being made by the receiving processor do not use the system resources that are being updated by the initiating zone, there is no need for processors running in a zone different than the quiesce-initiator's zone to be interrupted. This decreases the number of processors that need to be interrupted for a particular quiesce request and, in turn, also decreases the overall time needed to handle the quiesce request since the initiator needs to wait for fewer processors to respond to the interruption request.

Thus, although attempts have been made to reduce the amount of time that processors are quiesced (e.g., for system resource updates), enhancements are still needed.

BRIEF SUMMARY OF THE INVENTION

An exemplary embodiment of the present invention includes a method for facilitating processing of a computing environment. The method includes receiving a quiesce request at a system controller from an initiating processor. The quiesce request is sent to a plurality of processors. Notification is received at the system controller that the processors have finished purging their translation look aside buffers (TLBs). A fast quiesce reset command is received at the system controller from the initiating processor once updates to the system resources are complete. It is indicated to the processors that the block translation restriction can be dropped in response to receiving the fast quiesce reset command, thereby allowing the processors to continue processing without block translation restrictions.

Another exemplary embodiment includes a system for facilitating processing of a computing environment. The system includes a system controller and computer instructions for implementing a method. The method includes receiving a quiesce request at the system controller from an initiating processor. The quiesce request is sent to a plurality of processors. Notification is received at the system controller that the processors have finished purging their translation look aside buffers (TLBs). A fast quiesce reset command is received at the system controller from the initiating processor once updates to the system resources are complete. It is indicated to the processors that the block translation restriction can be dropped in response to receiving the fast quiesce reset command, thereby allowing the processors to continue processing without block translation restrictions.

A further exemplary embodiment includes a computer program product for facilitating processing of a computing environment. The computer program product includes a tangible storage medium readable by a processing circuit and storing instructions for execution by the processing circuit for performing a method. The method includes receiving a quiesce request at a system controller from an initiating processor. The quiesce request is sent to a plurality of processors. Notification is received at the system controller that the processors have finished purging their translation look aside buffers (TLBs). A fast quiesce reset command is received at the system controller from the initiating processor once updates to the system resources are complete. It is indicated to the processors that the block translation restriction can be dropped in response to receiving the fast quiesce reset command, thereby allowing the processors to continue processing without block translation restrictions.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

In an exemplary embodiment, reductions are made to the amount of time the processors within a zone are blocked from making storage accesses that may be associated with the system resources associated with a quiesce request.

Figure 1:
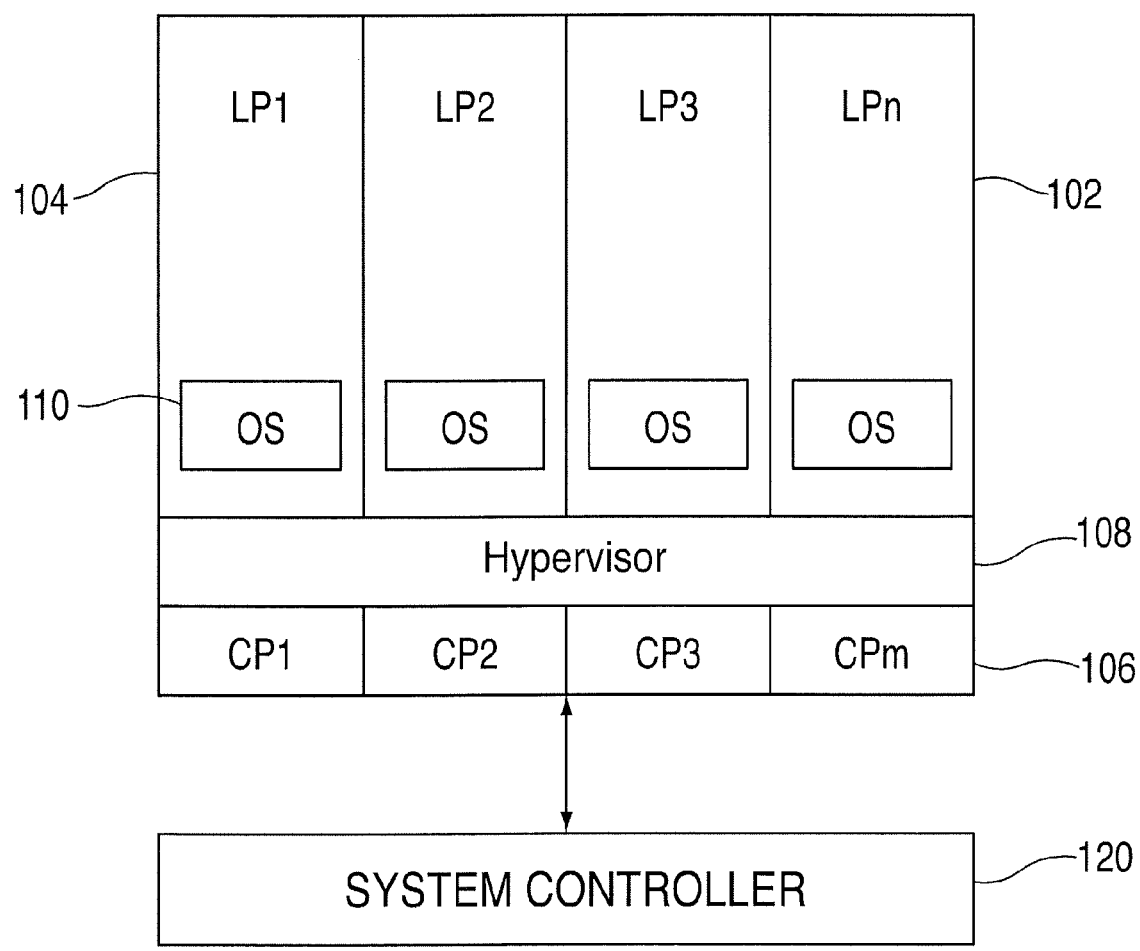
FIG. 1 depicts one embodiment of a computing environment that may be implemented by an exemplary embodiment of the present invention.

One embodiment of a computing environment 100 incorporating and using one or more aspects of the present invention is described with reference to FIG. 1. Computing environment 100 is based, for instance, on the z/Architecture offered by International Business Machines Corporation, Armonk, N.Y. The z/Architecture is described in an IBM® publication entitled, "z/Architecture Principles of Operation," IBM Publication No. SA22-7832-00, December 2000, which is hereby incorporated herein by reference in its entirety. In one example, a computing environment based on the z/Architecture includes an eServer zSeries, offered by International Business Machines Corporation, Armonk, N.Y.

As one example, computing environment 100 includes a central processor complex (CPC) 102 coupled to a system controller 120. Central processor complex 102 includes, for instance, one or more partitions 104 (e.g., logical partitions LP1-LPn), one or more central processors 106 (e.g., CP1-CPm), and a hypervisor 108 (e.g., a logical partition manager), each of which is described below.

Each logical partition 104 is capable of functioning as a separate system. That is, each logical partition 104 can be independently reset, initially loaded with an operating system 110, if desired, and operate with different programs. An operating system 110 or application program running in a logical partition 104 appears to have access to a full and complete system, but in reality, only a portion of it is available. A combination of hardware and Licensed Internal Code (commonly referred to as microcode or millicode) keeps a program in one logical partition from interfering with a program in a different logical partition. This allows several different logical partitions 104 to operate on a single or multiple physical processors in a time sliced manner. In this particular example, each logical partition 104 has a resident operating system 110, which may differ for one or more logical partitions 104. In one embodiment, operating system 110 is the z/OS operating system, offered by International Business Machines Corporation, Armonk, N.Y.

Central processors 106 are physical processor resources that are allocated to the logical partitions 104. For instance, a logical partition 104 includes one or more logical processors, each of which represents all or a share of physical processor resources 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors 106. One example of hypervisor 108 is the Processor Resource/Systems Manager (PR/SM), offered by International Business Machines Corporation, Armonk, N.Y.

System controller 120, which is coupled to the central processor complex, includes centralized logic responsible for arbitrating between different processors issuing requests. For instance, when system controller 120 receives a quiesce request, it determines that the requester is the initiating processor for that request and that the other processors are receiving processors; it broadcasts messages; and otherwise, handles requests. Further details are described with reference to FIG. 2.

Figure 2:
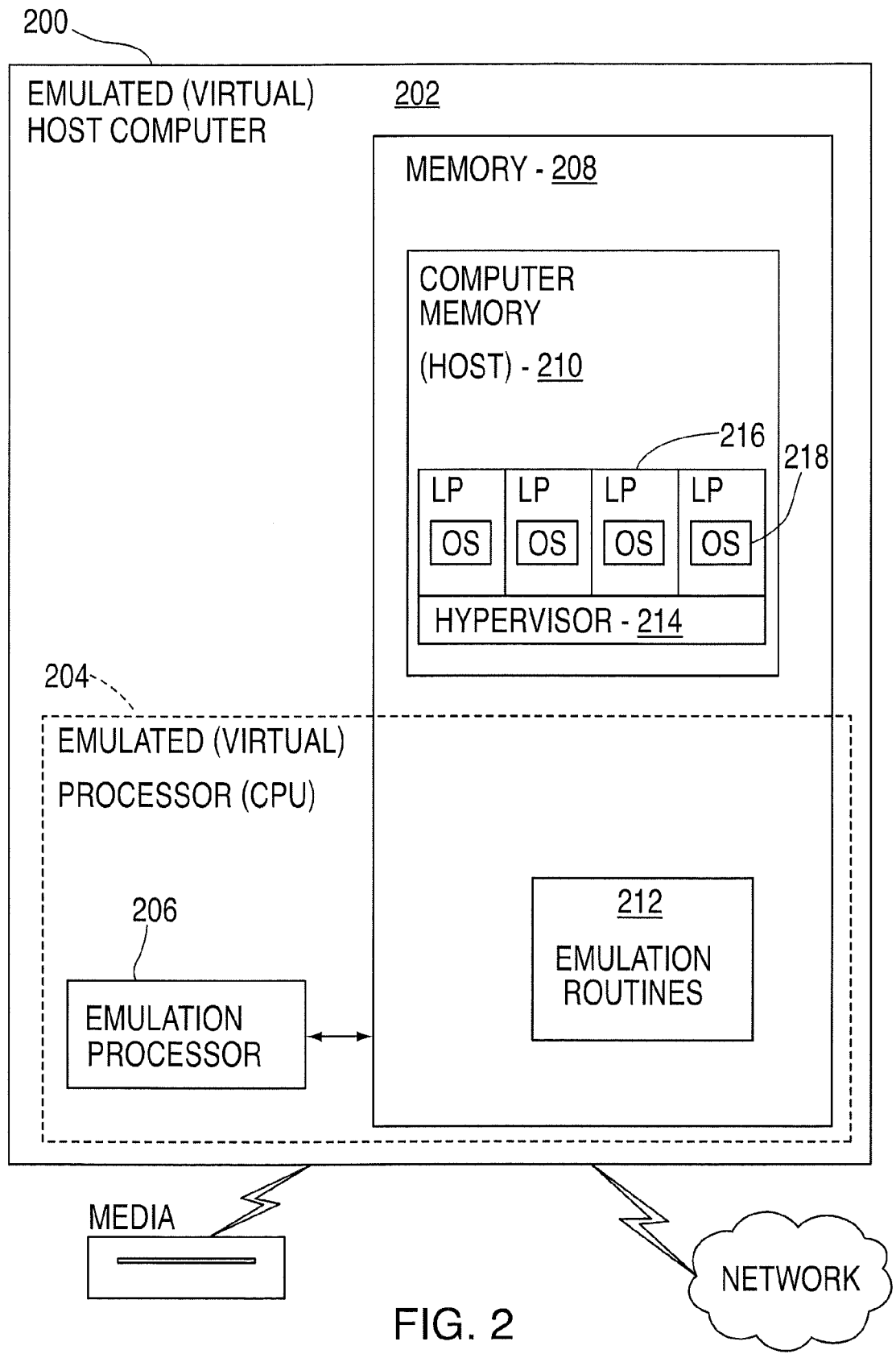
FIG. 2 depicts one embodiment of an emulated computing environment that may be implemented by an exemplary embodiment of the present invention.

Another example of a computing environment to incorporate one or more aspects of the present invention is depicted in FIG. 2. In this example, an emulated host computer system 200 is provided that emulates a host computer system 202 of a host architecture. In emulated host computer system 200, a host processor (CPU) 204 is an emulated host processor (or virtual host processor) and includes an emulation processor 206 having a different native instruction set architecture than used by the processors of host computer 202. Emulated host computer system 200 has memory 208 accessible to emulation processor 206. In the example embodiment, memory 208 is partitioned into a host computer memory 210 portion and an emulation routines 212 portion. Host computer memory 210 is available to programs of emulated host computer 200 according to host computer architecture, and may include both a host or hypervisor 214 and one or more hypervisors 214 running logical partitions (LPs) 216 running operating systems 218, analogous to the like-named elements in FIG. 1.

Emulation processor 206 executes native instructions of an architected instruction set of an architecture other than that of the emulated processor 204, the native instructions obtained from emulation routines memory 212, and may access a host instruction for execution from a program in host computer memory 210 by employing one or more instruction(s) obtained in a sequence & access/decode routine which may decode the host instruction(s) accessed to determine a native instruction execution routine for emulating the function of the host instruction accessed. One such host instruction may be, for example, a Start Interpretive Execution (SIE) instruction, by which the host seeks to execute a program in a virtual machine. The emulation routines 212 may include support for this instruction, and for executing a sequence of guest instructions in accordance with the definition of this SIE instruction.

Other facilities that are defined for host computer system 202 architecture may be emulated by architected facilities routines, including such facilities as general purpose registers, control registers, dynamic address translation, and I/O subsystem support and processor cache for example. The emulation routines may also take advantage of functions available in emulation processor 204 (such as general registers and dynamic translation of virtual addresses) to improve performance of the emulation routines. Special hardware and offload engines may also be provided to assist processor 206 in emulating the function of host computer 202.

The interruption of processors to honor the quiesce request is needed to prevent inconsistent values for translation tables or storage keys from being observed in the middle of an instruction or function. Originally, the quiesce interruption was honored by all processors in the system. In actuality, when the active zone on the receiving processor is different from the zone that initiated the quiesce operation, the storage accesses being made by the receiving processor do not use the system resources that are being updated by the initiating zone. As a result, there is no need for processors running in a zone different than the quiesce-initiator's zone to be interrupted. We refer to this a "zone filtering" and it is accomplished by tagging each quiesce request with a zone number equal to the active zone of the initiator.

Since the TLB 1 contains entries for the current zone only, it does not hold any entries relevant to an IPTE, IDTE, CSP or CSPG request from a different zone and, therefore, it does not need to process the invalidation and associated quiesce interruption at all. In the case of an SSKE initiated by a different zone, there may be host entries in the local TLB 1 which contain the old key value. The invalidation of these entries, however, can be delayed, as long as it is done before executing any host instructions. Even when running in a different zone than the quiesce initiator, the TLB2 may have entries relevant to the quiesce request, although they are not currently being used. The TLB2 must invalidate the appropriate entries, although when the requesting zone is different than the initiator it may be done in the background, using the provided zone number and other relevant information. This decreases the number of processors that need to be interrupted for a particular quiesce request and, in turn, also decreases the overall time needed to handle the quiesce request since you need to wait for fewer processors to respond to the interruption request.

An exemplary algorithm that may be implemented by the translator in an exemplary embodiment to determine if any particular quiesce request can filtered includes: 1) the incoming quiesce request is a host request, 2) the receiving processor is currently running in host mode or 3) the active zone of the receiving processor matches the active zone of the quiesce initiator; then the translator must honor (i.e. can not filter) the quiesce interruption request 418. Otherwise, the processor may filter the request.

Figure 3:
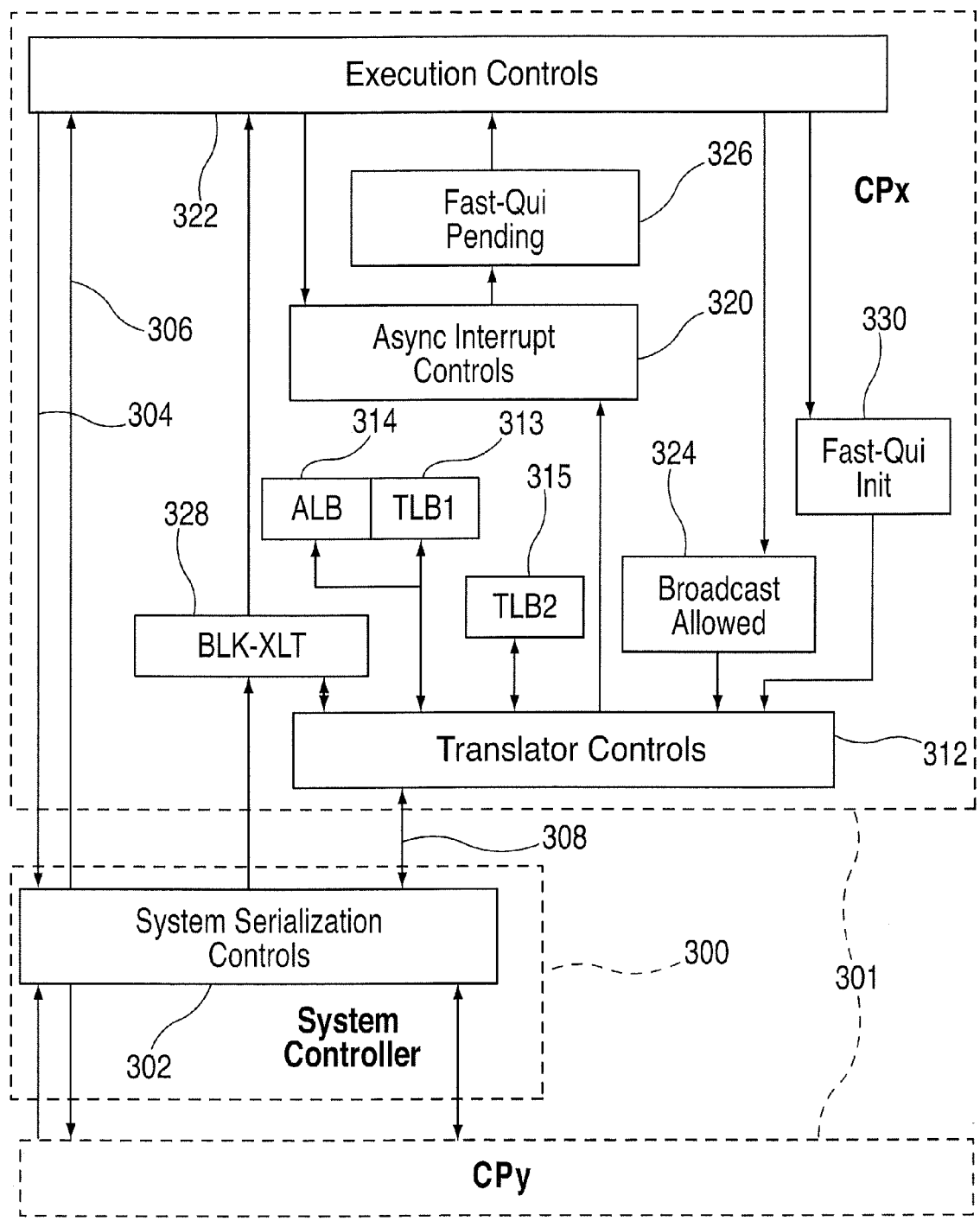
FIG. 3 depicts one embodiment of further details associated with a controller of FIG. 1, in accordance with an aspect of the present invention.

FIG. 3 depicts one example of a system controller 300 coupled to a plurality of central processors (CPUs) 301. In this example, two central processors are depicted. However, it will be understood that more than two processors may be coupled to system controller 300.

System Controller 300 includes various controls including, for instance, system serialization controls 302. The system serialization controls 302 are used to insure that operations that are to be serialized, such as Invalidate Page Table Entry (IPTE), Invalidate DAT Table Entry (IDTE), Set Storage Key Extended (SSKE), or Compare and Swap and Purge (CSP and CSPG) instructions, are serialized, such that only one such instruction is in progress at one time in the computing environment. It also monitors the sequence of events for that operation.

System controller 300 is coupled to each central processor 301 via various interfaces. For instance, an interface 304 to the controller 300 is used by the Licensed Internal Code in a central processor to send "control" commands, which specify an action to be taken, and to send "sense" commands, which return information from the controller 300. Another interface is a response bus 306, which is used to return information from the controller 300 for the "sense" commands. The response bus 306 is also used to communicate command status for "control" commands, and may be set from a plurality of sources within the controller 300, including the system serialization controls 302. A central processor 301 can use this interface to sense the state of the system serialization controls 302 in system controller 300.

A further interface is interface 308, which provides commands to translator controls 312 of central processor 301. Translator controls 312 process commands, in response to the signals. In one example, translator controls 312 process commands that affect one or more buffers, such as Translation Look-aside Buffers (TLBs) 313 and 315 and Access-Register-Translation Look-aside Buffers (ALBs) 314, described in further detail below.

In addition to translator controls 312, central processor 301 includes various other controls, including, for instance, asynchronous interruption controls 320 and execution controls 322. When the translator controls 312 receive a quiesce purge request from the controller 302, it determines if the request requires an interruption to this processor 301 and if it does, it sends a signal to the asynchronous interruption controls 320. In response to this, asynchronous interrupt controls 320 cause an internal fast-quiesce interruption 326 to be pending in the receiving processor, which in turn, causes execution controls 322 to suspend program instruction processing, at the next interruptible point. In response to the interruption, execution controls 322 invokes a millicode routine to set a broadcast operation allowed latch 324 to enable translator controls 312 to process the pending request. This causes the block-translation (BLK-XLT) latch 328 to be set on all processors 301 besides the fast-quiesce initiator, indicated by latch 330, until the system controller 300 receives the reset fast-quiesce command from the quiesce initiator. The block-translation latch 328 indicates to the translator controls 312 that certain translations (which may be associated with the pending system update) should be held until this latch 328 has dropped.

The above described computing environment is only one example. Many variations are possible without departing from the spirit of the present invention. For example, one or more partitions can be running in different architecture modes. Further, as another example, the environment need not be based on the z/Architecture, but instead, can be based on other architectures offered by Intel, Sun Microsystems, as well as others.

In one embodiment, to initiate a quiesce operation, the quiesce millicode issues a quiesce request to the system controller (SC) 300. In order to manage multiple quiesce operations, the SC serializes the quiesce commands and guarantees that only one is active in the system at any given time. In the system serialization controls 302, the SC maintains a Quiesce State Machine (QSM) that tracks the progress of the quiesce request in the system. In one implementation, the QSM tracks if the quiesce engine is idle ('00'B), is waiting for the receiving processors to handle the quiesce request ('01'B) or is waiting for the initiating processor to reset the quiesce request indicating it has updated the system resources and all TLBs have completed the request ('10'B). This is described in more detail in FIG. 4.

Figure 4A:
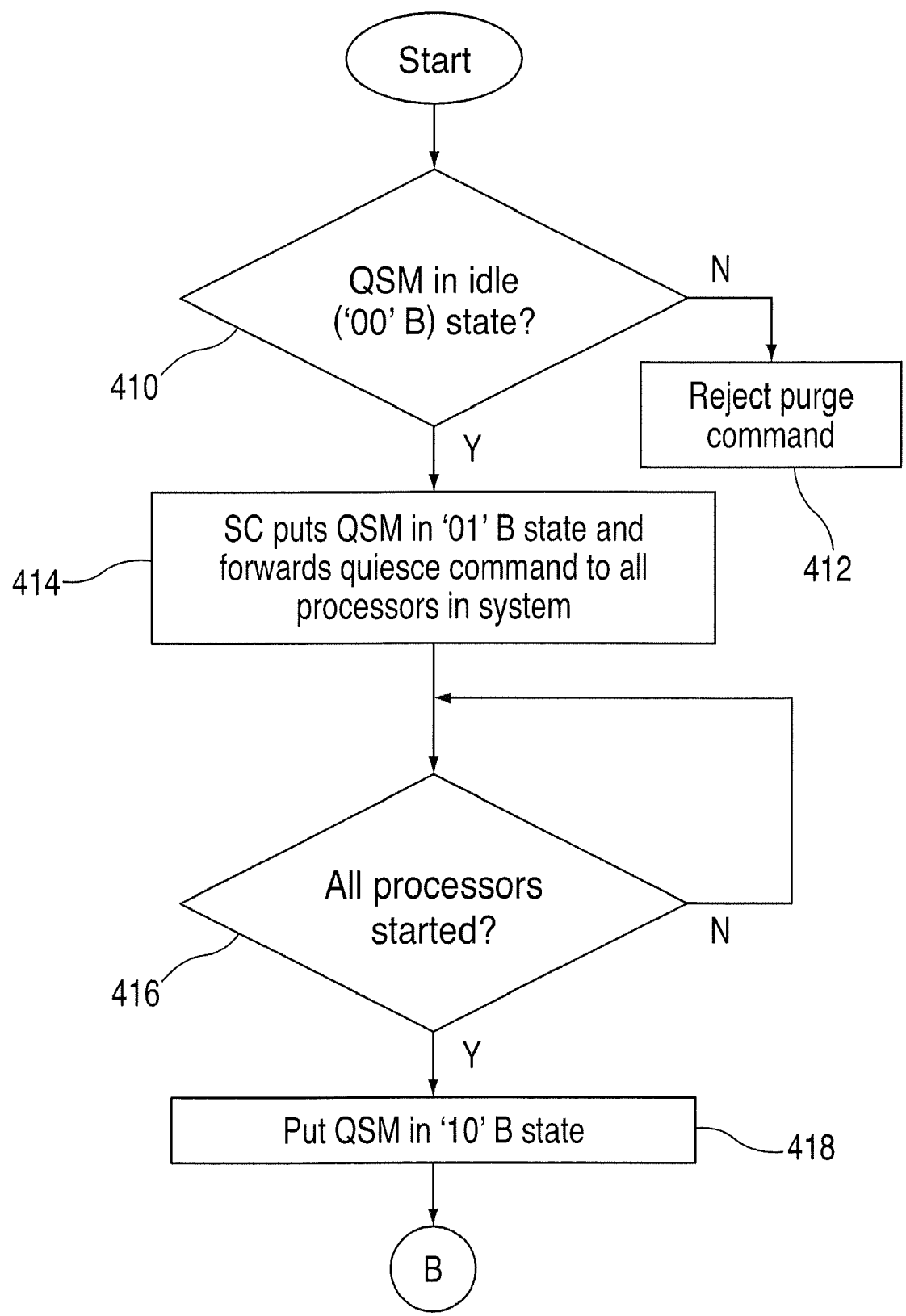
FIGS. 4A-4B depict one embodiment of the logic associated with the management of a quiesce state machine, in accordance with an aspect of the present invention.
Figure 4B:
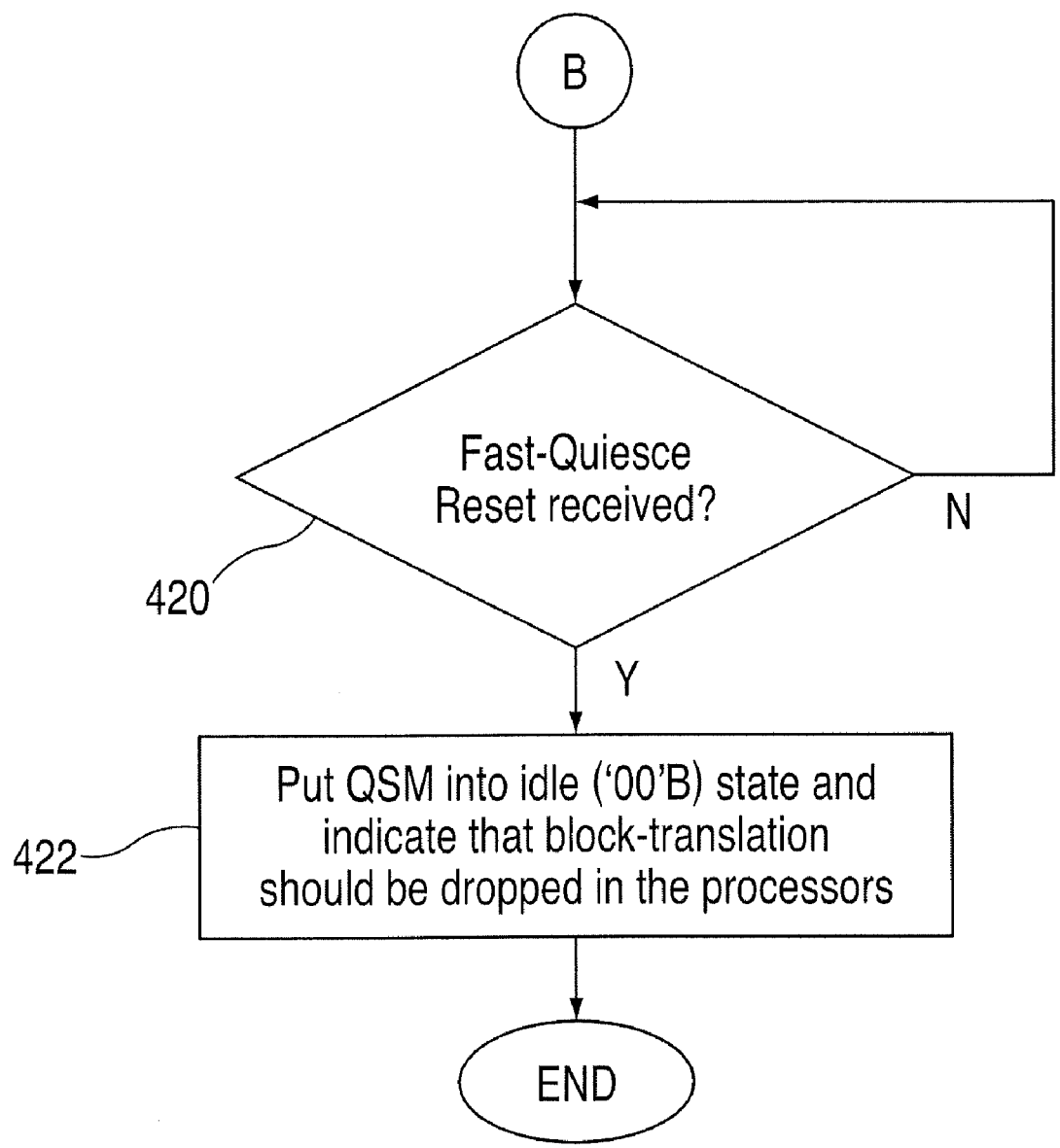

Beginning in FIG. 4A, when the SC receives a quiesce request and the Quiesce State Machine (QSM) is not in the '00'B (idle) state (410), the SC will reject the request (412). If the quiesce engine is idle (410), it will accept the quiesce request, set the QSM to the '01' B state, and forward the request to all the processors 301 (as depicted in FIG. 3) in the system (414). Once receiving an indication from each translator that the associated processor has started the quiesce purge request (416), the QSM will enter the '10'B state (418). Continuing in FIG. 4B, when the SC receives a reset fast-quiesce command from the processor that initiated the quiesce request (420), it will reset the QSM to the idle state and indicates that the block-translation latch should be dropped (422). The quiesce engine is now ready to handle the next quiesce request.

Figure 5A:
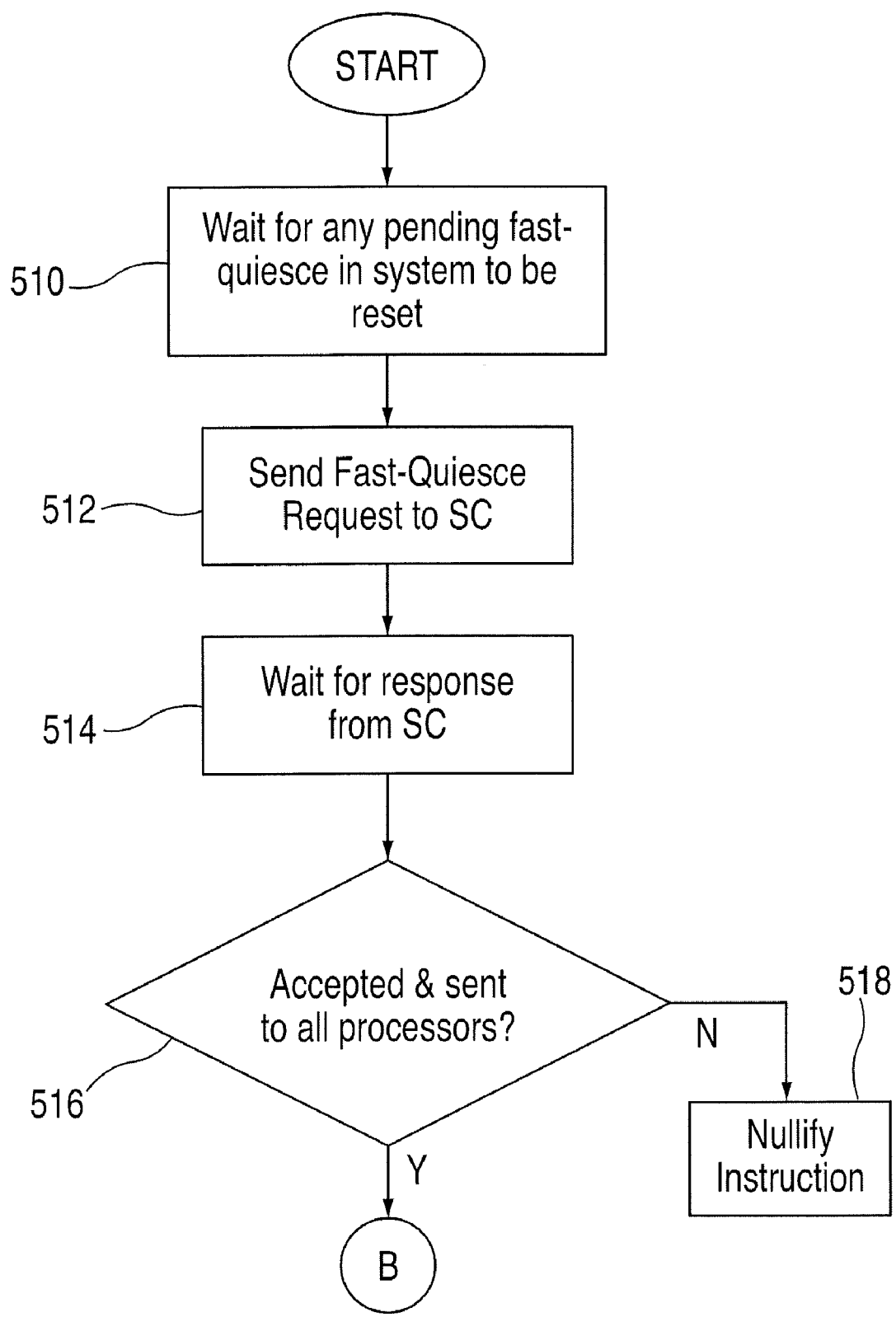
FIGS. 5A-5B depict one embodiment of the flow associated with controlling a system resource update across a computing environment, in accordance with an aspect of the present invention.
Figure 5B:
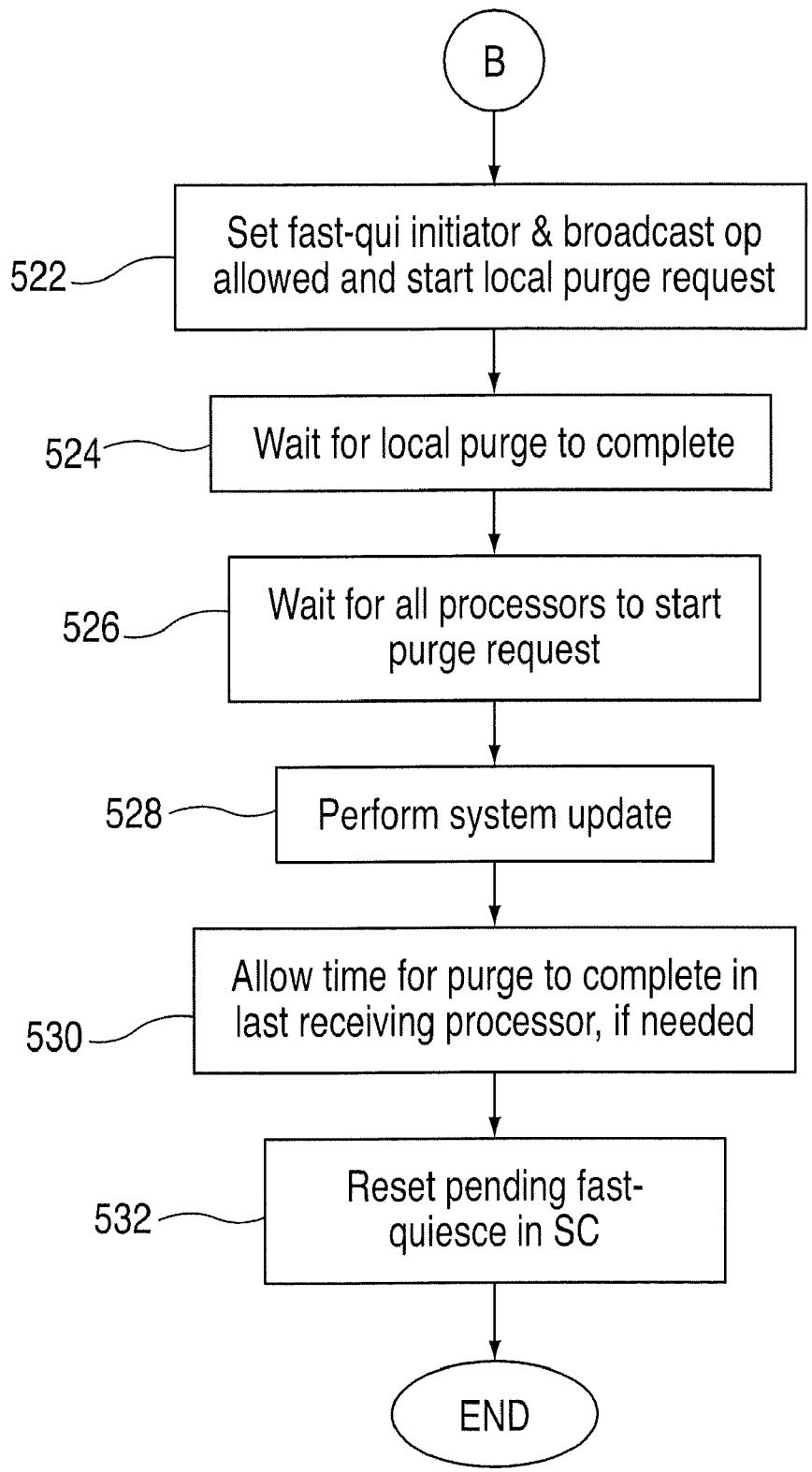

In one embodiment, the millicode on the fast-quiesce initiator (e.g., the processor that initiated the quiesce request) performs a series of tasks which include those steps described in FIGS. 5A and 5B. In particular, in FIG. 5A it begins its operation by waiting for any pending fast-quiesce to be reset in the system (510). Once any pending request has completed, as indicated by the SC, it sends its own fast-quiesce request to the SC (512). The SC receives the request and if no other fast-quiesce request has already been accepted, it will forward the request to all the processors in the system and send a response back to the initiating processor indicating that the request was accepted. If, however, there is already another fast-quiesce request being processed, the SC will send a response indicating that the request has been rejected. The millicode waits for the response from the SC (514) and then determines if the request was accepted or rejected (516).

If the response was rejected (518) the instruction is nullified and will be reissued. If the response was accepted (516), as depicted in FIG. 5B the millicode will set the fast-quiesce-initiator latch 330 (as depicted in FIG. 3), which indicates that block-translation does not apply to this processor, and the broadcast-op-allowed latch 324 (as depicted in FIG. 3), which causes the invalidation to be started in the TLB1s (522). The millicode in the initiating processor then waits for its own invalidation to complete (524) and then for the SC to indicate that all processors have started the purge (526). Once this has occurred, the initiating processor performs the system update (528). In the case of SSKE, this is a key update and in the case of IPTE, IDTE, CSP and CSPG it is a storage update.

The initiating processor then, for operations that require significant time to process in the TLB1s, must allow enough time to pass to guarantee that all TLBs in the system have completed the invalidation (530). Once this has occurred, it sends a command to the SC to reset the fast-quiesce request in the system (532).

Figure 6A:
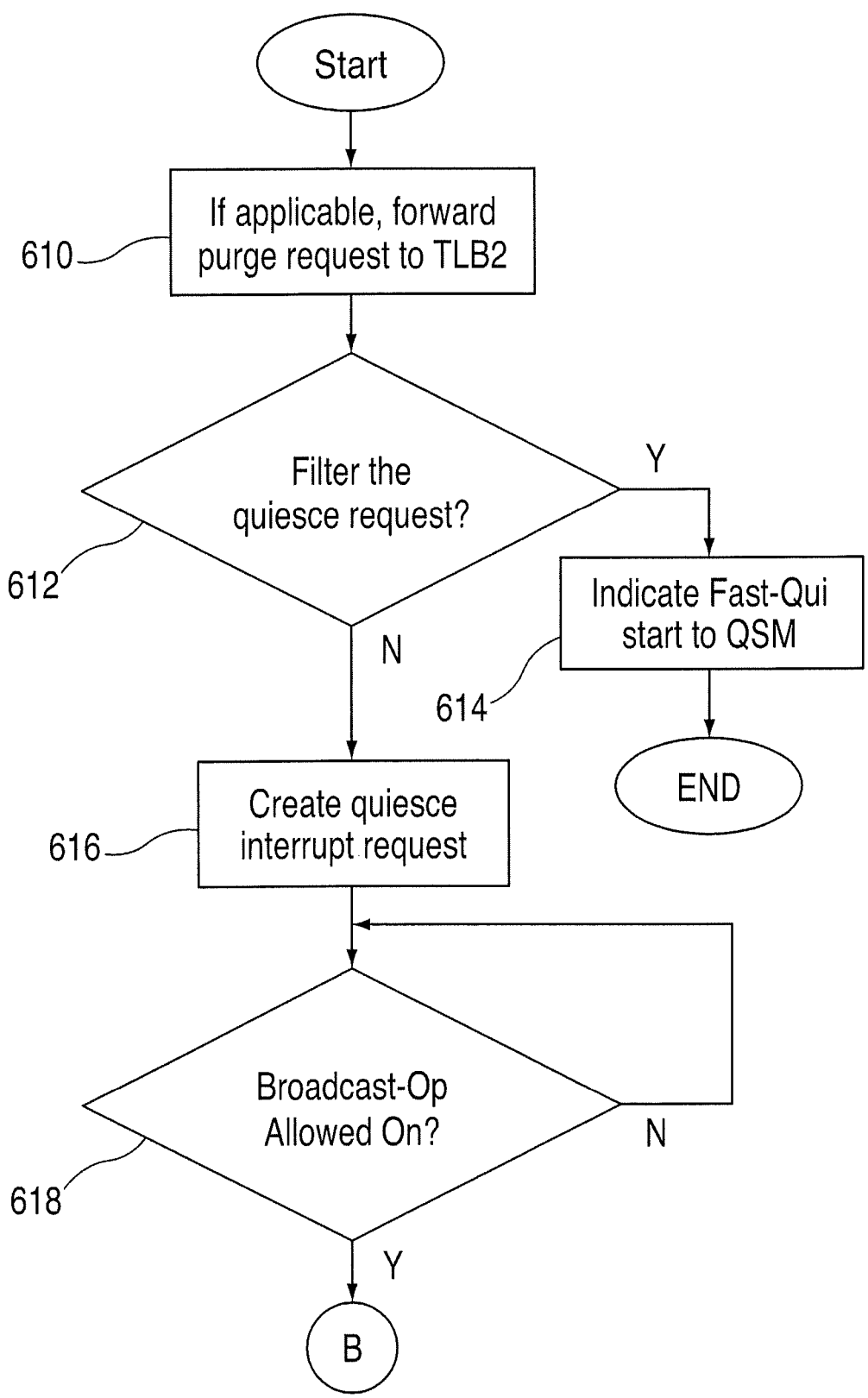
FIGS. 6A-6C depict one embodiment of the flow associated with receiving and processing a purge associated with the system resource update, in accordance with an aspect of the present invention.
Figure 6B:
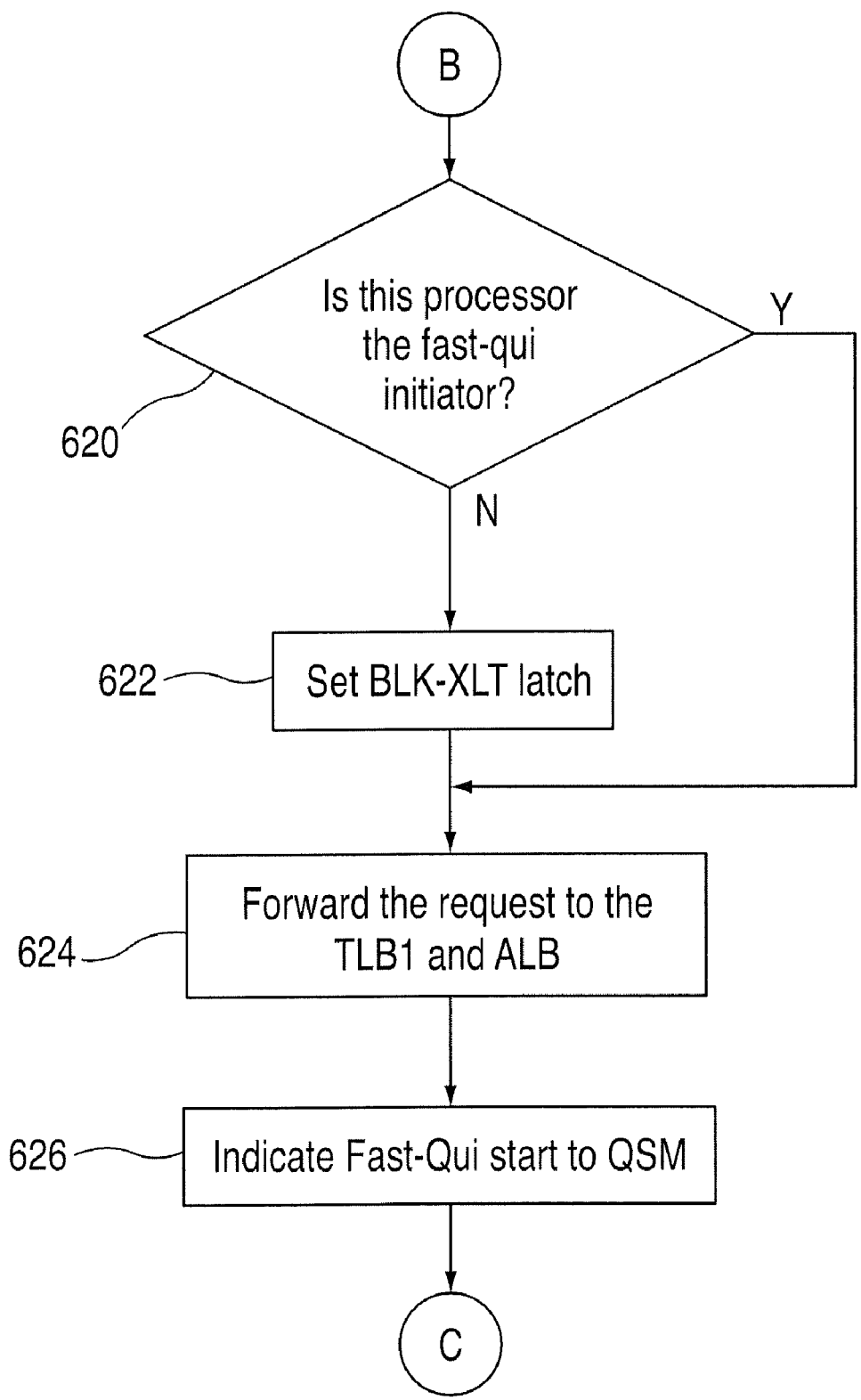

In one embodiment, the translator on the receiver of the quiesce request performs those steps described in FIGS. 6A-6B. In particular, in FIG. 6A it begins by forwarding the quiesce purge request to the TLB2, if applicable (610). The command must be forwarded to the TLB2 if the TLB has buffered any information which may be dependent on the system resource being updated. The translator then determines if the quiesce request is to be filtered by this processor (612). This determination is, in general, based on whether the initiating zone is the same as the zone that is currently running on the processor. If this request can be filtered, then the translator indicates to the quiesce state machine (QSM) in the SC that the request has been started on this processor (614).

If the request is not filtered, i.e. it is honored, on this processor then the translator sends a quiesce interruption request to the asynchronous interruption logic. It is prioritized with other interruptions and forwarded it to the execution controls (616). On a receiving processor, when the processor is at an interruptible point, it will handle the interruption by invoking the quiesce interruption handler in millicode. On the quiesce initiator, the quiesce interruption will be handled by the millicode after it receives indication from the SC that its request was accepted and has been forwarded to all the processors in the system. When handling the fast-quiesce interruption, millicode sets broadcast-op-allowed (618) indicating that the quiesce purge request can be forwarded to the TLB1 and ALB.

As shown in FIG. 6B, if this processor is not the processor that initiated the quiesce request (620) then the translator sets the block-translation latch (622). This latch prevents that processor from performing any translation which may be dependent on the system resources being updated by this quiesce command. It then forwards the purge command to the TLB1 and ALB (624) and indicates to the QSM that this processor has started the quiesce purge request (626).

Figure 6C:
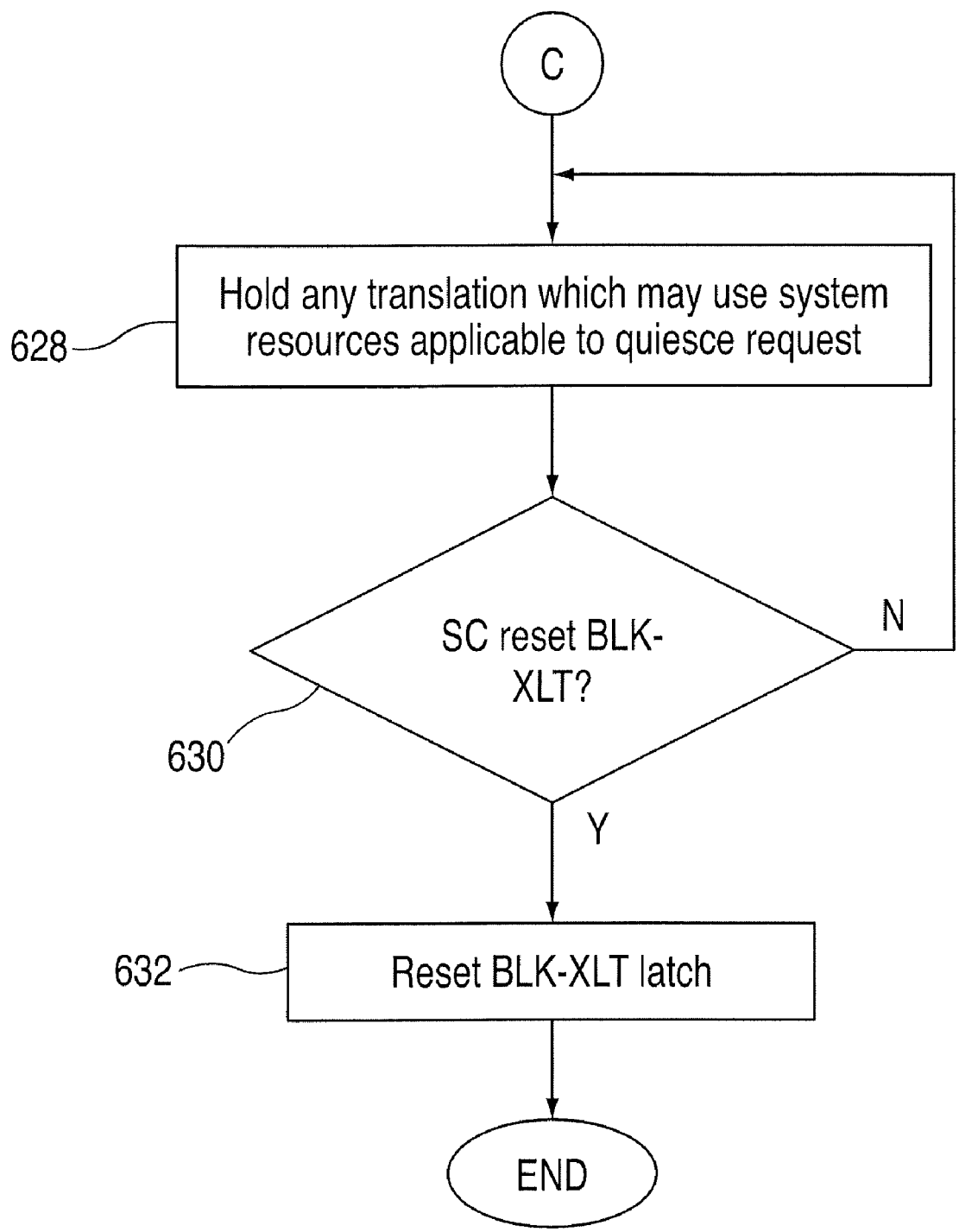

As shown in FIG. 6C, the block-translation latch remains on and the translator continues to block relevant translations (628) until the SC indicates that the block-translation latch can be reset (630). The SC does this once it has received the fast-quiesce reset command from the initiating processor. The translator can then reset its block-translation latch (632) and continue with normal operation.

In prior art, the translator (depicted as translator controls 312 in FIG. 3) is able to handle only one broadcast quiesce request at a time. This is because the translator does not have the ability to buffer a second request. The SC and millicode guarantee that it will not receive a second broadcast-op while the TLBs are still processing the first. This is because the SC only allows for one broadcast-op to be executed at a time (410 in FIG. 4A) and millicode waits to guarantee that long quiesce ops complete in all the local TLBs (530 in FIG. 5B) before resetting the quiesce state machine (QSM) in the SC (532 in FIG. 5B).

After each receiving processor within the quiesce initiator's zone completes the purge in its TLBs and exits the interruption handler, the block-translation latch (328 in FIG. 3) prevents that processor from performing any translation which may be dependent on the system resources being updated by this quiesce instruction (628 & 630 in FIG. 6). Since 1) the millicode must delay the fast-quiesce reset to guarantee that a second fast-quiesce request is not sent to the translator before the first is complete in its TLBs and 2) this same fast-quiesce reset also resets the block-translation trigger, there is the additional overhead that block-translation remains on, unnecessarily, even after the associated system resource has been updated.

Figure 7A:
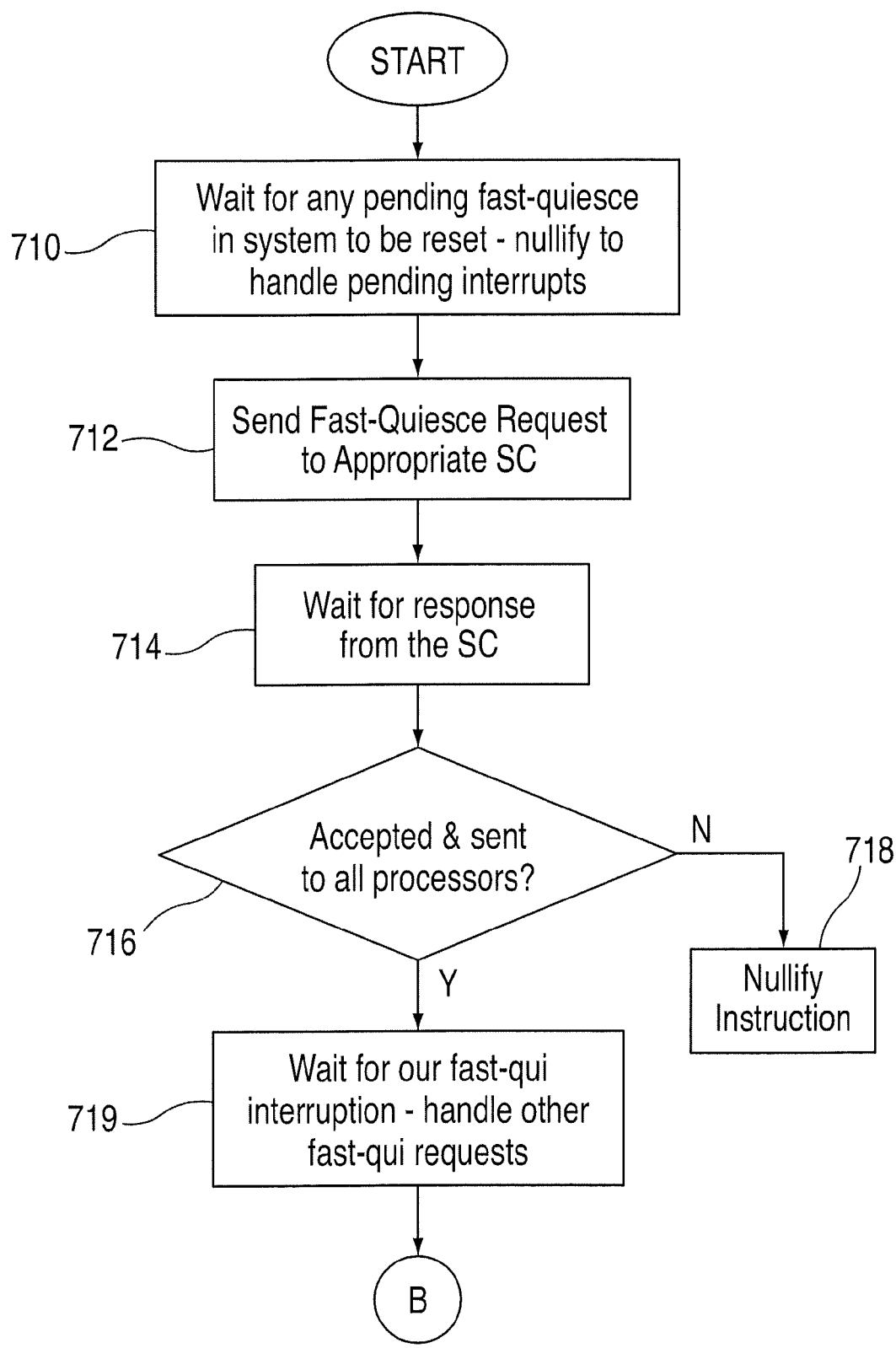
FIGS. 7A-7B depict one embodiment of the flow associated with controlling a system resource update across a computing environment when hardware tracks the completion of the quiesce purge in the TLBs, in accordance with an aspect of the present invention.
Figure 7B:
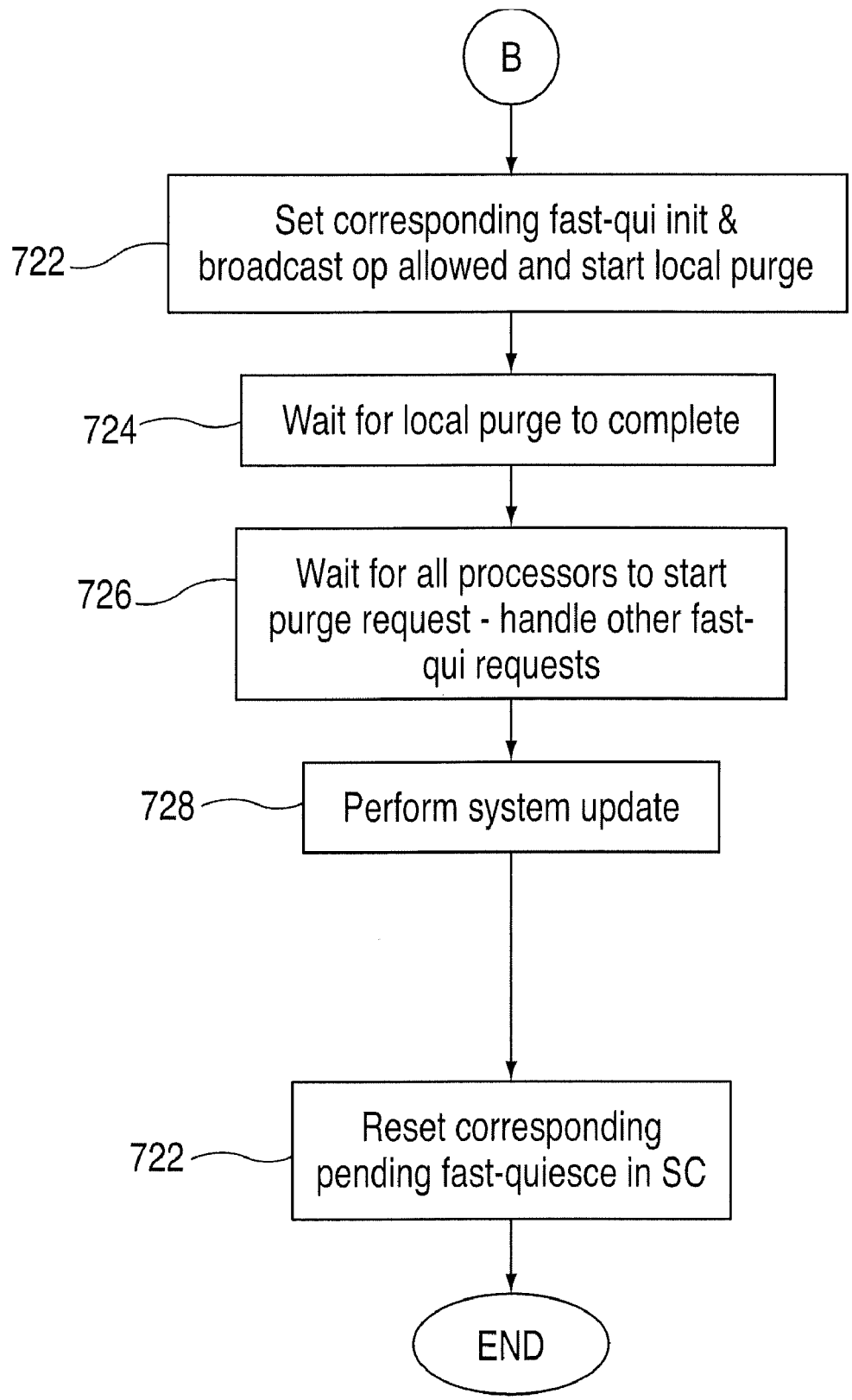

In accordance with an aspect of the present invention, a new state ('11'b) was added to QSM. This state indicates that the TLBs are all finished but the QSM has not received the fast-quiesce reset. Since the TLBs and SC are tracking when all the TLBs in the system have completed the operation, the millicode can send the fast-quiesce reset once the system resource update is complete. It does not need to delay to account for the worse case purge time on the final processor as was done in step 530 of FIG. 5B. This new flow is depicted in FIGS. 7A-7B. The step numbers correspond to those used in FIG. 5B. For example, step 510 in FIG. 5A is identical to step 710 in FIG. 7A. The only difference between the two figures is that FIG. 7B has no step to correspond to step 530 in FIG. 5B.

To support this new QSM state, the fast-quiesce-active signal is sent from each processor to the SC and indicates that that processor started the quiesce purge (transition from 0 to 1) and then that it has completed the purge (transition from 1 to 0). This signal is used for both filtered and non-filtered fast-quiesce operations. In addition, a new latch is defined which indicates that the fast-quiesce reset was received but the all the TLBs may not yet have completed the purge operation. When this latch is set, if a new fast-quiesce request comes into the SC, it will not be reject but will instead be held until the TLB purges are complete. This potentially saves the overhead of having the processor receive a reject response from the SC (516 in FIG. 5A), having to nullify the instruction (518) so that it can be retried and eventually reissuing another quiesce purge command to the SC.

Figure 8A:
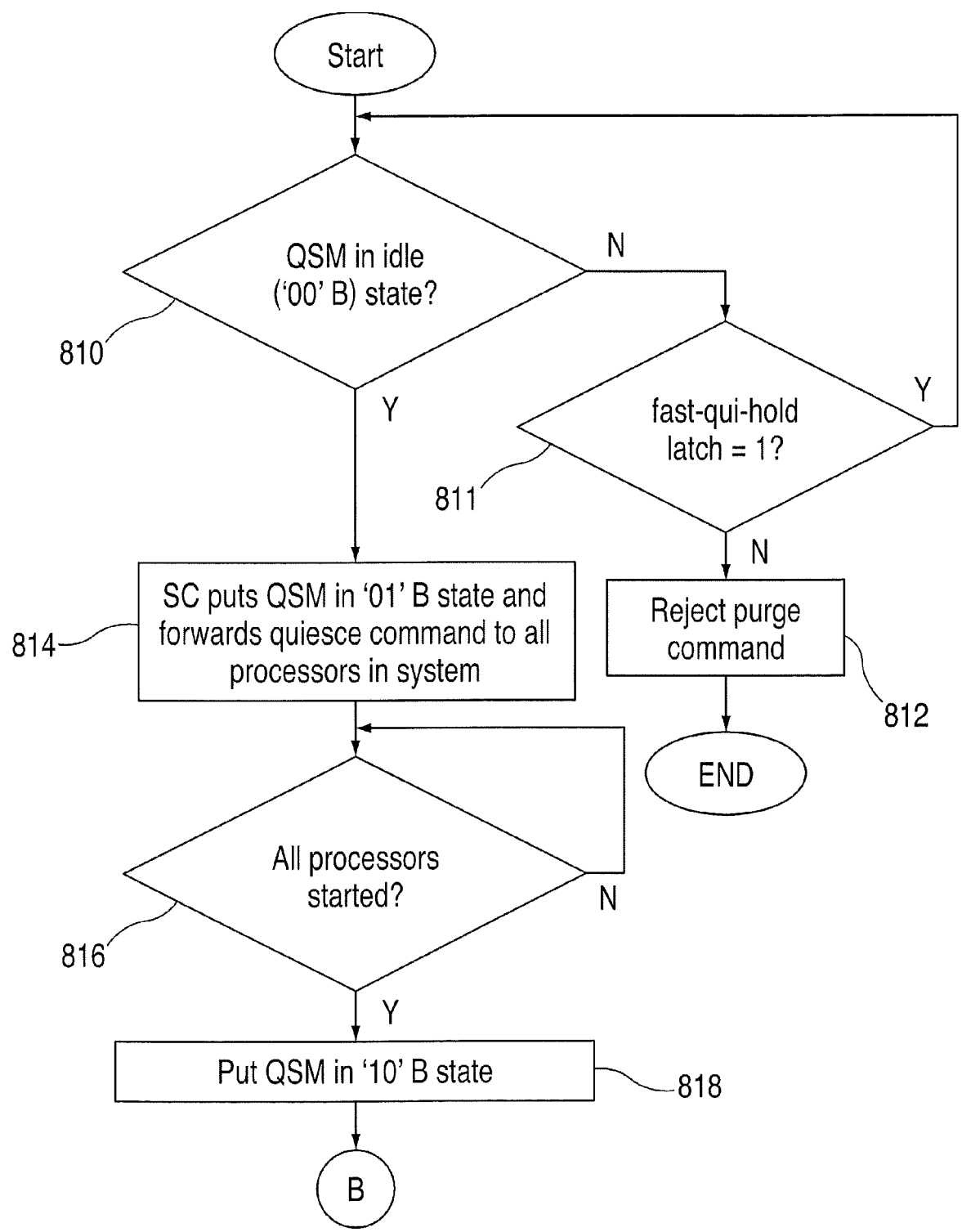
FIGS. 8A-8C depict one embodiment of the logic associated with the management of a quiesce state machine with a new state added, in accordance with an aspect of the present invention.
Figure 8B:
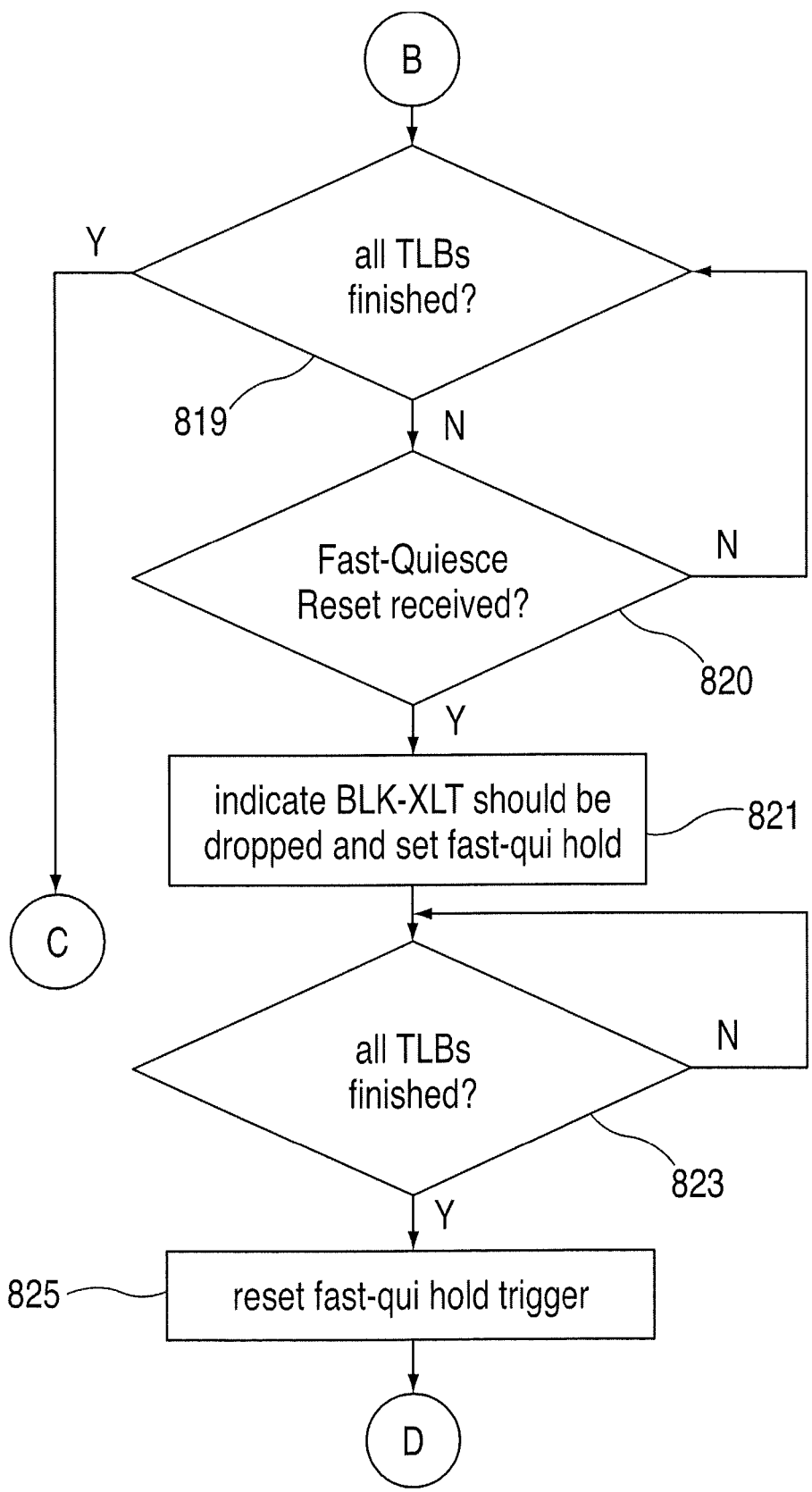
Figure 8C:
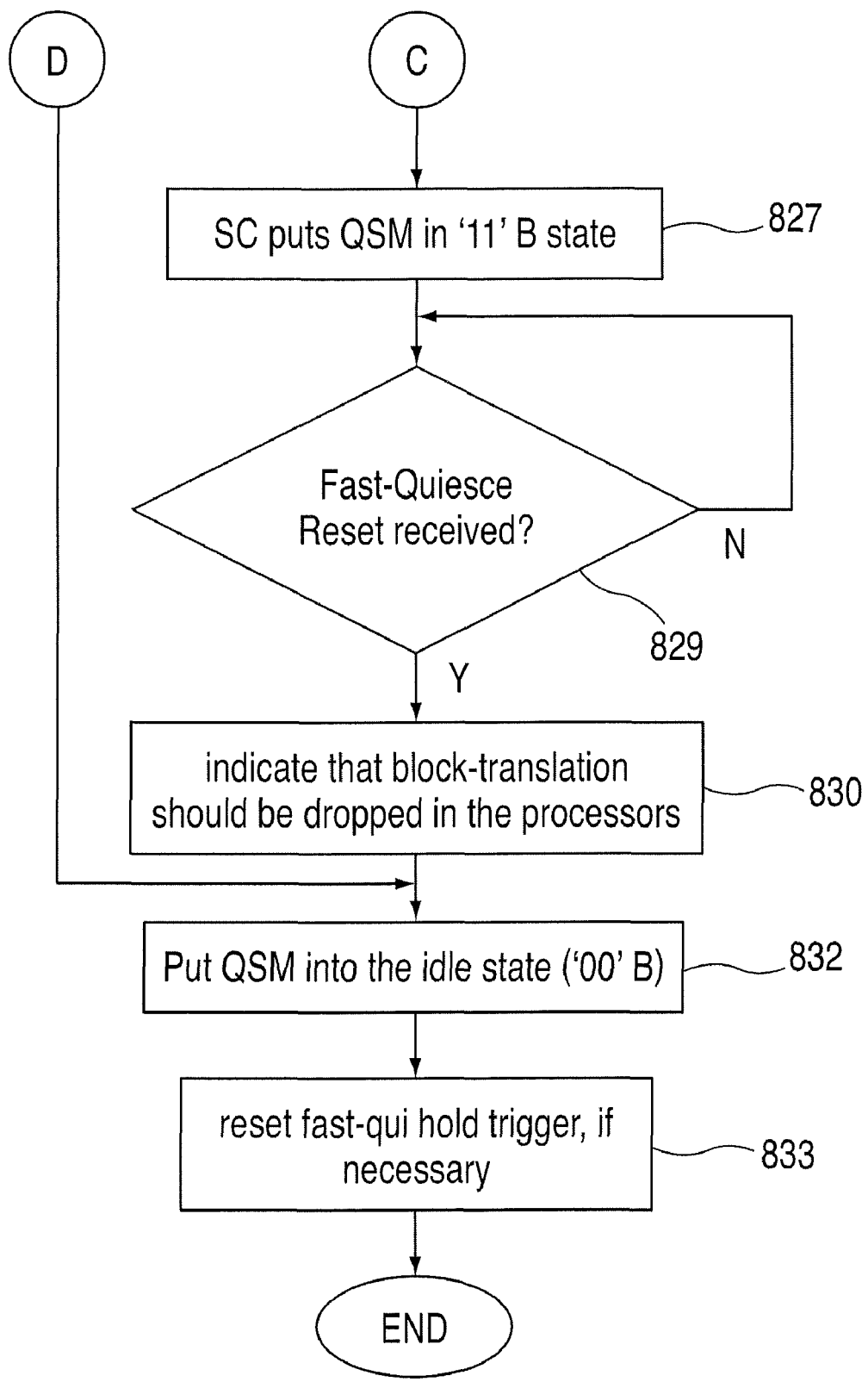

FIGS. 8A-8C depict one example of a flow that would be used to implement the QSM including the new state. The numbers used in the diagram map to the numbers used in FIGS. 4A-4B with step 810 in FIG. 8A corresponding to step 410 in FIG. 4A, etc. The steps labeled with odd numbers in FIGS. 8A-8B represent new steps that are only present in these figures. When the SC receives a quiesce request from a processor, it checks to see if the QSM is in the idle '00'B state (810). If it is not, then the new invention provides a mechanism (a fast-quiesce-hold latch) which indicates that, potentially, at least one TLB has not yet completed the quiesce purge operation. If the fast-quiesce-hold latch is on (811) then, even though the QSM is busy, the quiesce operation will potentially not be rejected but will be held by the SC until QSM reaches the idle state of fast-qui-hold drops. If the QSM is busy (810) and the fast-quiesce-hold latch is off (811), then the quiesce request will be rejected (812) as in prior art.

If the QSM is idle when the quiesce request is received (810) then the SC puts the QSM in the '01' B state, to indicate that is no longer idle, and it forwards the quiesce command to all the processors in the system (814). Once all the processors have started the purge request (816), as indicated by each processor setting the fast-quiesce-active line, the QSM is put in the '10'B state (818).

As indicated in FIG. 8B, the SC then waits for either all the TLBs to finish (819) or for the fast-quiesce reset to be received (820). If the fast-quiesce reset is received first (820) then the SC indicates to the processors that block-translation should be dropped (821) and it sets the fast-quiesce hold latch (821) to indicate that quiesce requests should be held until all the TLBs have completed the purges. The QSM then waits for all TLBs to finish the purge operation (823) and when done, as depicted in FIG. 8C, puts the QSM in the idle state (832) and resets the fast-quiesce-hold latch (833). In FIG. 8B, if the TLB finishes (819) before the fast-quiesce reset is received then the QSM is put in the new '11'B state (827) and then it waits for the fast-quiesce reset to be received (829). When it is received, the SC indicates that block-translation should be dropped (830) and it puts the QSM in the idle state (832).

Technical effects and benefits include a reduction in the amount of time the processors within the zone are blocked from making storage accesses that may be associated with the system resources associated with the quiesce request. One advantage of this invention is that the typical case that would be seen, does not suffer the overhead of an additional transition in the QSM. This typical case is the case where the quiesce purge does not take a long time in the TLBs and, therefore, fast-quiesce active will drop, to indicate all TLBs have completed the purge, and the QSM will transition to the new '11'b state before the initiating processor has the opportunity to issue the fast-quiesce reset. In prior art, for the potentially long running operation, the millicode had to delay the sending of fast-quiesce reset to account for the worse case. The use of hardware monitoring allows the hardware to react to the actual processing time instead of having to account for the worse case.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, the embodiments of the invention may be embodied in the form of computer-implemented processes and apparatuses for practicing those processes. The capabilities of the present invention can be implemented in software, firmware, hardware or some combination thereof. For example, embodiments of the invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for facilitating processing of a computing environment, the method comprising:
   receiving a quiesce request at a system controller from an initiating processor;
   sending the quiesce request to a plurality of processors;
   receiving a fast quiesce reset command at the system controller from the initiating processor once updates to system resources are complete;
   indicating to the plurality of processors that a block translation restriction can be dropped in response to receiving the fast quiesce reset command, thereby allowing the plurality of processors to continue processing without block translation restrictions;
   receiving an other quiesce request at the system controller;
   determining a status of a translation look aside buffer (TLB) purging process at the plurality of processors in response to receiving the fast quiesce reset command and to receiving the other quiesce request, the status being one of complete and incomplete; and
   holding the other quiesce request in response to the status of the TLB purging process being incomplete.

2. The method of claim 1, further comprising sending the other quiesce request to the plurality of processors in response to the status of the TLB purging process being complete.

3. The method of claim 1, further comprising in response to the holding continuing to determine the status of the TLB purging process at the plurality of processors and sending the other quiesce request to the plurality of processors in response to the status of the TLB purging process being complete.

4. The method of claim 1, further comprising setting the status of the TLB purging process to incomplete in response to sending the quiesce request to the plurality of processors, and setting the status of the TLB purging process to complete in response to receiving a notification at the system controller that the plurality of processors have finished purging their TLBs.

5. The method of claim 1, wherein a latch is set to indicate that the status of the TLB purging process is incomplete and the latch is reset to indicate that the status of the TLB purging process is complete, and the determining is responsive to the latch.

6. A system for facilitating processing of a computing environment, the system comprising:
   a system controller; and
   computer instructions located on the system controller for implementing a method comprising:
      receiving a quiesce request at the system controller from an initiating processor;
      sending the quiesce request to a plurality of processors;
      receiving a fast quiesce reset command at the system controller from the initiating processor once updates to system resources are complete;
      indicating to the plurality of processors that a block translation restriction can be dropped in response to receiving the fast quiesce reset command, thereby allowing the plurality of processors to continue processing without block translation restrictions;
      receiving an other quiesce request at the system controller;
      determining a status of a translation look aside buffer (TLB) purging process at the plurality of processors in response to receiving the fast quiesce reset command and to receiving the other quiesce request, the status being one of complete and incomplete; and
      holding the other quiesce request in response to the status of the TLB purging process being incomplete.

7. The system of claim 6, wherein the method further comprises sending the other quiesce request to the plurality of processors in response to the status of the TLB purging process being complete.

8. The system of claim 6, wherein the method further comprises in response to the holding continuing to determine the status of the TLB purging process at the plurality of processors and sending the other quiesce request to the plurality of processors in response to the status of the TLB purging process being complete.

9. The system of claim 6, wherein the method further comprises setting the status of the TLB purging process to incomplete in response to sending the quiesce request to the plurality of processors, and setting the status of the TLB purging process to complete in response to receiving a notification at the system controller that the plurality of processors have finished purging their TLBs.

10. The system of claim 6, further comprising a latch, wherein the latch is set to indicate that the status of the TLB purging process is incomplete and the latch is reset to indicate that the status of the TLB purging process is complete, and the determining is responsive to the latch.

11. A computer program product for facilitating processing of a computing environment, the computer program product comprising:
    a non-transitory storage medium readable by a processing circuit and storing instructions for execution by the processing circuit for performing a method comprising:
       receiving a quiesce request at a system controller from an initiating processor;
       sending the quiesce request to a plurality of processors;
       receiving a fast quiesce reset command at the system controller from the initiating processor once updates to system resources are complete;
       indicating to the plurality of processors that a block translation restriction can be dropped in response to receiving the fast quiesce reset command, thereby allowing the plurality of processors to continue processing without block translation restrictions;
       receiving an other quiesce request at the system controller;
       determining a status of a translation look aside buffer (TLB) purging process at the plurality of processors in response to receiving the fast quiesce reset command and to receiving the other quiesce request, the status being one of complete and incomplete; and
       holding the other quiesce request in response to the status of the TLB purging process being incomplete.

12. The computer program product of claim 11, wherein the method further comprises sending the other quiesce request to the plurality of processors in response to the status of the TLB purging process being complete.

13. The computer program product of claim 11, wherein the method further comprises in response to the holding continuing to determine the status of the TLB purging process at the plurality of processors and sending the other quiesce request to the plurality of processors in response to the status of the TLB purging process being complete.

14. The computer program product of claim 11, wherein the method further comprises setting the status of the TLB purging process to incomplete in response to sending the quiesce request to the plurality of processors, and setting the status of the TLB purging process to complete in response to receiving a notification at the system controller that the plurality of processors have finished purging their TLBs.

15. The computer program product of claim 11, wherein the method further comprises setting a latch is set to indicate that the status of the TLB purging process is incomplete and the latch is reset to indicate that the status of the TLB purging process is complete, and the determining is responsive to the latch.

\* \* \* \* \*